US007716590B1

(12) United States Patent
Nathan

(10) Patent No.: US 7,716,590 B1
(45) Date of Patent: May 11, 2010

(54) METHOD AND APPARATUS FOR DYNAMICALLY UPDATING A SECONDARY FORM ELEMENT BASED ON A SELECTION IN A PRIMARY FORM ELEMENT

(75) Inventor: Shivaguru Nathan, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 901 days.

(21) Appl. No.: 10/282,170

(22) Filed: Oct. 28, 2002

(51) Int. Cl.
*G06F 15/16* (2006.01)
*G06F 9/445* (2006.01)
*G06F 9/44* (2006.01)

(52) U.S. Cl. .................. 715/738; 717/113; 717/171
(58) Field of Classification Search .................. 715/804, 715/505, 506, 507, 508, 805, 738; 717/171, 717/116
See application file for complete search history.

(56) References Cited

U.S. PATENT DOCUMENTS 5,963,964 A * 10/1999 Nielsen .................. 715/501.1

6,769,019 B2 * 7/2004 Ferguson .................. 709/219
2002/0152234 A1 * 10/2002 Estrada et al. ........... 707/501.1
2002/0188936 A1 * 12/2002 Bojanic et al. .............. 717/171

OTHER PUBLICATIONS

Flanagan, David, "JavaScript: The Definitve Guide, 3rd Edition", Jun. 1998, O'Reilly, 3rd Edition, Chapter 16.*

* cited by examiner

*Primary Examiner*—William L Bashore
*Assistant Examiner*—Jordany Núñez
(74) *Attorney, Agent, or Firm*—Park, Vaughan & Fleming LLP

(57) ABSTRACT

One embodiment of the present invention provides a system that facilitates updating a secondary form element in a web browser based on a selection of data in a primary form element. The system starts by receiving the selection of data in the primary form element in the web browser. Once the selection has been made, the system spawns a secondary instance of the web browser and sends the selection of data to a server from the secondary instance of the web browser. Next, the system receives a response from the server at the secondary instance of the web browser, which includes data for the secondary form element, wherein the data corresponds to the selection of data in the primary form element. The secondary instance of the web browser uses this data for the secondary form element to update the secondary form element in the web browser.

16 Claims, 2 Drawing Sheets

METHOD AND APPARATUS FOR DYNAMICALLY UPDATING A SECONDARY FORM ELEMENT BASED ON A SELECTION IN A PRIMARY FORM ELEMENT

BACKGROUND

1. Field of the Invention

The present invention relates to web applications. More specifically, the present invention relates to a method and an apparatus for dynamically updating a secondary form element in a web browser based on a selection in a primary form element.

2. Related Art

The explosive growth of the Internet, including the increasing availability of broadband connections, has made the Internet an effective tool for commerce and information exchange. Many companies and organizations now routinely sell products and disseminate information online. In most cases, these tasks involve a user entering information into web-based form, and subsequently submitting the information to a server. Quite often, information placed in certain fields in these forms depends on information placed in other fields. For example, the selection of state in the state field might limit the choices available in a city field, or the selection of the date in a date field might limit the time slots available in a requested appointment time field.

The task of dynamically modifying content based on user inputs has commonly been dealt with in two ways. In one method, the web page is pre-loaded with all of the choices for the secondary form field for each possible corresponding choice in the primary form field. For example, in the application where a user is required to pick a state and a city, the web page is pre-loaded with all of the states and their corresponding cities. When the user subsequently makes a selection in the state form field, the city form field is dynamically configured from the data already preloaded into the web page at the client to include only the cities that are in the selected state. This method, however, results in longer page loading times and, consequently, increases bandwidth utilization. Moreover, it consumes more memory at the client.

The second major method for dynamic modification of content based on user inputs is by updating the entire page after the first selection is made. For example, when a user chooses a state in the state field, the contents of the state field is submitted to the server, and the server returns a new page that includes the list of cities in the city field that correspond to the selected state. This new page is subsequently presented to the user. This method also increases bandwidth utilization because the entire page has to be reloaded. In addition, the user is presented with a blank screen while the page refreshes, and this method does not allow a user to complete the form out of order, because until the state is selected, the city selection list remains empty.

What is needed is a method and an apparatus for dynamically modifying content of a web page based on user interaction that does not exhibit the limitations listed above.

SUMMARY

One embodiment of the present invention provides a system that facilitates updating a secondary form element in a web browser based on a selection of data in a primary form element. The system starts by receiving the selection of data in the primary form element in the web browser. Once the selection has been made, the system spawns a secondary instance of the web browser and sends the selection of data to a server from the secondary instance of the web browser. Next, the system receives a response from the server at the secondary instance of the web browser, which includes data for the secondary form element, wherein the data corresponds to the selection of data in the primary form element. The secondary instance of the web browser uses this data for the secondary form element to update the secondary form element in the web browser.

In a variation on this embodiment, the system spawns the secondary instance of the web browser in a minimized state and without focus, thereby hiding the secondary instance of the web browser from the user.

In a variation on this embodiment, updating the secondary form element further comprises creating a selection list in the secondary form element, thereby enabling a user to make a selection from the selection list in the secondary form element.

In a variation on this embodiment, the primary form element can be one of a checkbox, a textbox, a radio button, a drop-down list, and a button.

In a variation on this embodiment, the secondary form element can be one of a checkbox, a textbox, a radio button, a drop-down list, and a button.

In a variation on this embodiment, the task of spawning the secondary instance of the web browser is performed by a client-side script.

In a variation on this embodiment, once the secondary form element has been updated, the system closes the secondary instance of the web browser.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs.

Computer Network

Figure 1:
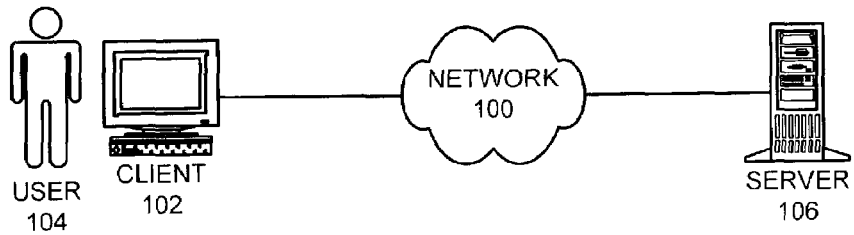
FIG. 1 illustrates a computer network in accordance with an embodiment of the present invention.

FIG. 1 illustrates a computer network 100 in accordance with an embodiment of the present invention. Network 100 can generally include any type of wire or wireless communication channel capable of coupling together computing nodes. This includes, but is not limited to, a local area network, a wide area network, or a combination of networks. In one embodiment of the present invention, network 100 includes the Internet.

Client 102 and server 106 are coupled to network 100. Client 102 can generally include any node on a network including computational capability and including a mechanism for communicating across the network. Server 106 can generally include any computational node including a mechanism for servicing requests from client 102 for computational and/or data storage resources. User 104 interacts with various applications distributed across network 100 through client 102.

Web-Based Application

Figure 2:
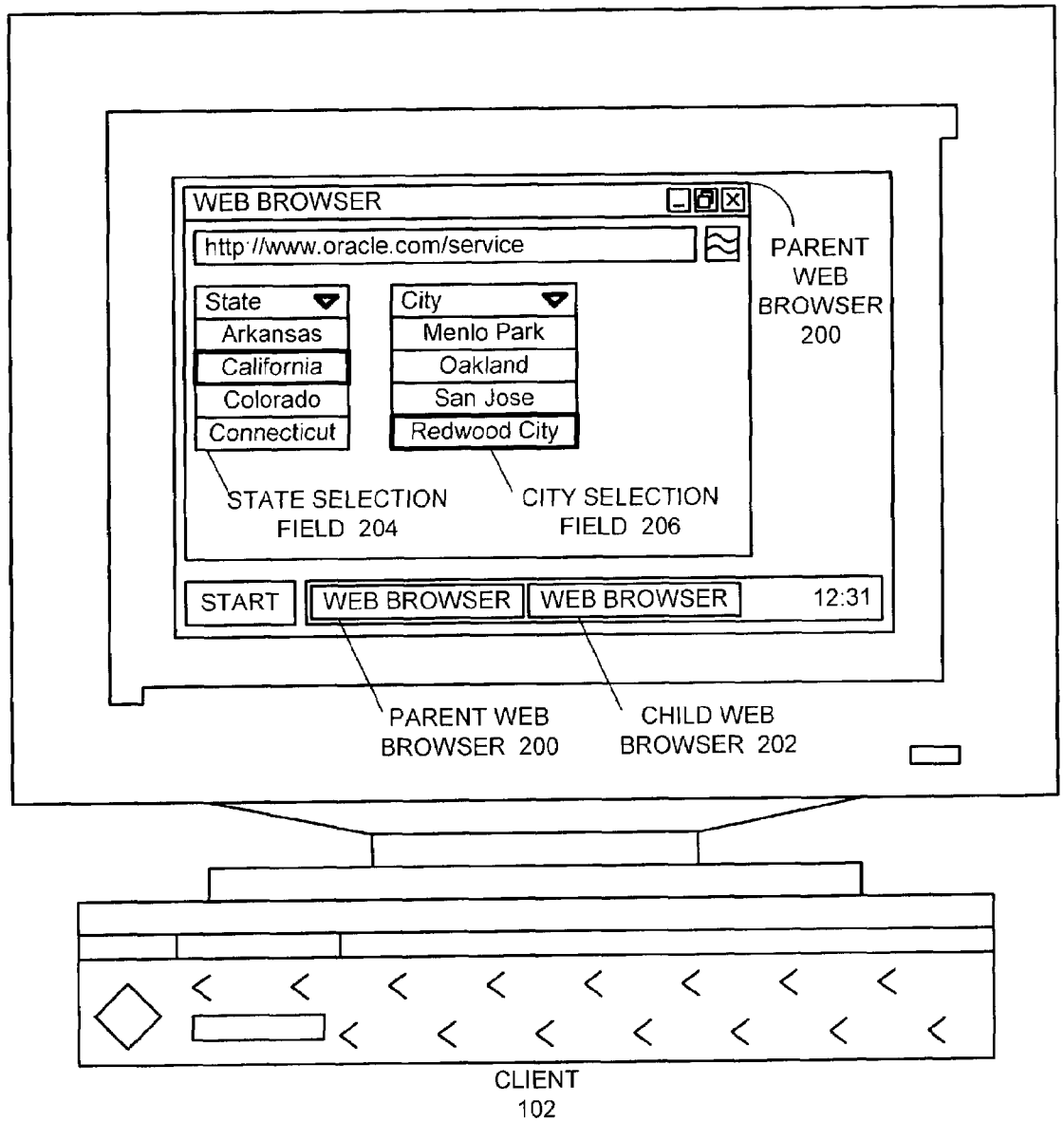
FIG. 2 illustrates a web-based application in accordance with an embodiment of the present invention.

FIG. 2 illustrates a web-based application in accordance with an embodiment of the present invention. Client 102 contains parent web browser 200 and child web browser 202. Parent web browser contains state selection field 204 and city selection field 206. State selection field 204 and city selection field 206 are part of a distributed web application that is running on client 102 and server 106 across network 100. In the embodiment of the present invention illustrated in FIG. 2, state selection field 204 and city selection field 206 are drop-down select boxes. Note that state selection field 204 and city selection field 206 can generally include any type of form field such as a checkbox, a textbox, a radio button, a drop-down list, or a button.

During operation, child web browser 202 is opened by a client-side script running in parent web browser 200. Child web browser 202 sends the selection made in state selection field 204 to server 106, and receives a list of cities to populate city selection field 206 in parent web browser 200. Note that child web browser 202 is of zero size and is minimized without focus. Moreover, user 104 is unable to select child web browser 202, and the actions of child web browser 202 are unperceivable to user 104. Moreover, child web browser 202 closes upon updating city selection field 206.

Process of Dynamically Updating Form Fields

Figure 3:
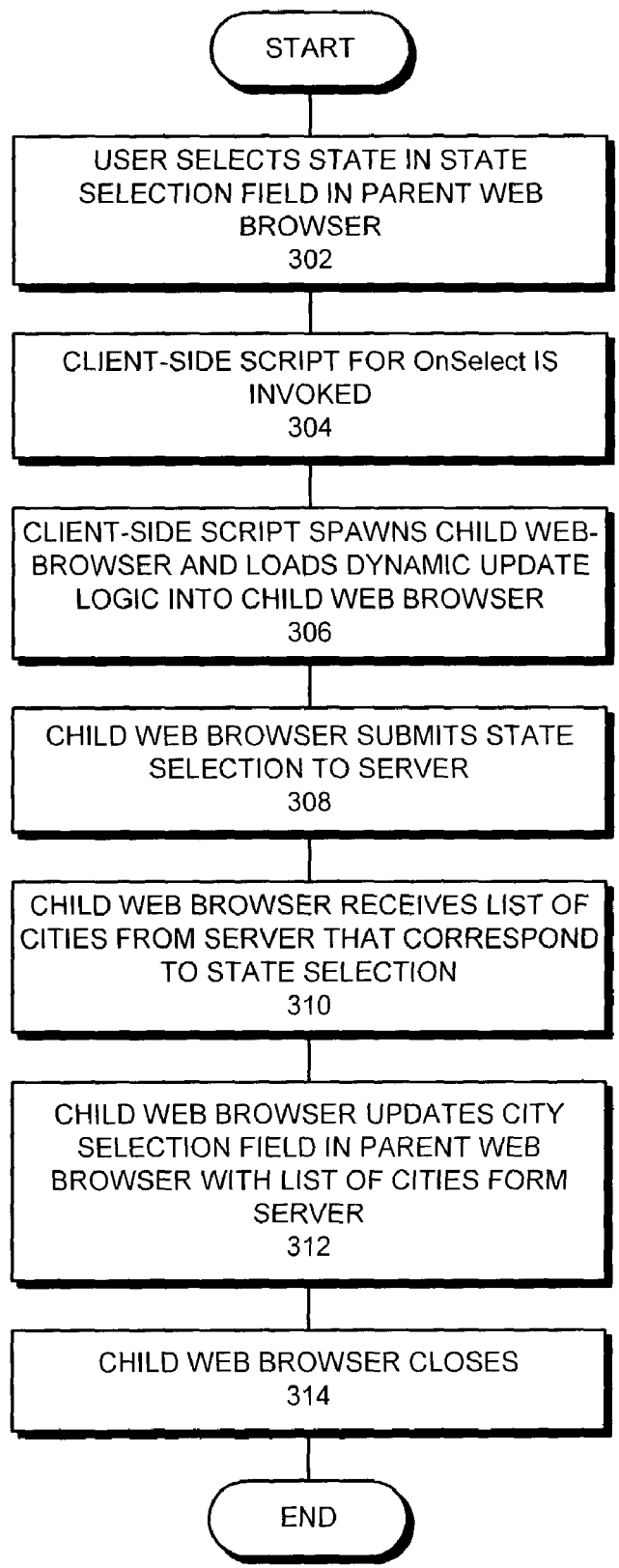
FIG. 3 presents a flowchart illustrating the process of dynamically updating form fields in accordance with an embodiment of the present invention.

FIG. 3 presents a flowchart illustrating the process of dynamically updating form fields in accordance with an embodiment of the present invention. The system starts by receiving a selection of a state in state selection field 204 in parent web browser 200 (step 302). When the state selection is made, the client-side script for the OnSelect event is invoked (step 304). This client-side script spawns child web browser 202 and loads child web browser 202 with dynamic update logic for updating city selection field 206 in parent web browser 200 (step 306). Note that child web browser 202 is of zero size and is minimized without focus. In this embodiment, user 104 is unable to select child web browser 202, and the actions of child web browser 202 are unperceivable to user 104.

Upon receiving the state selection from state selection field 204 and the dynamic update logic, child web browser 202 submits the state selection to server 106 via network 100 (step 308). In response to sending the selection, child web browser 202 receives a list of cities from server 106 that correspond to the state selected in state selection field 204 (step 310). Once this list of cities has been received, child web browser 202 uses the list of cities to update city selection field 206 in parent web browser 200 (step 312). At this point, the actions of child web browser 202 are complete, and consequently, child web browser 202 automatically closes (step 314). Note that this process can be recursively repeated. For example, upon selection of a city in city selection field 206, this process can be repeated to populate a list of streets in a street selection field.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for updating a city form element of a form in a parent web browser based on a selection of data in a state form element of the form without refreshing the parent web browser, the method comprising:
   displaying the form comprising the state form element and the city form element in the parent web browser;
   receiving the selection of data in the state form element in the parent web browser;
   in response to the selection of data in the state form element, spawning a child web browser by executing a client-side script in the parent web browser when an OnSelect event is invoked absent of assistance from any additional module;
   loading a dynamic update logic into the child web browser, wherein the dynamic update logic is configured to execute within the child web browser and to update the city form element in the parent web browser;
   sending the selection of data to a server from the child web browser;
   receiving a response from the server at the child web browser, wherein the response includes data for the city form element that corresponds to the selection of data in the state form element;
   executing the dynamic update logic at the child web browser to automatically update the city form element in the parent web browser using the data for the city form element in the response; and
   closing the child web browser after updating the city form element.

2. The method of claim 1, wherein spawning the child web browser further involves spawning the child web browser in a minimized state and without focus, whereby the child web browser is hidden from a user.

3. The method of claim 1, wherein updating the city form element further comprises creating a selection list, wherein a user will make a selection from the selection list for the city form element.

4. The method of claim 1, wherein the state form element can be one of a checkbox, a textbox, a radio button, a drop-down list, and a button.

5. The method of claim 1, wherein the city form element can be one of a checkbox, a textbox, a radio button, a drop-down list, and a button.

6. A computer-readable storage medium storing instructions that when executed by a computer cause the computer to perform a method for updating a city form element of a form in a parent web browser based on a selection of data in a state form element of the form without refreshing the browser, the method comprising:
   displaying the form comprising the state form element and the city form element in the parent web browser;
   receiving the selection of data in the state form element in the parent web browser;
   in response to the selection of data in the state form element, spawning a child web browser by executing a client-side script in the parent web browser when an OnSelect event is invoked absent of assistance from any additional module;

loading a dynamic update logic into the child web browser, wherein the dynamic update logic is configured to execute within the child web browser and to update the city form element in the parent web browser;

sending the selection of data to a server from the child web browser;

receiving a response from the server at the child web browser, wherein the response includes data for the city form element that corresponds to the selection of data in the state form element;

executing the dynamic update logic at the child web browser to automatically update the city form element in the parent web browser using the data for the city form element in the response; and closing the child web browser after updating the city form element.

7. The computer-readable storage medium of claim 6, wherein spawning the child web browser further involves spawning the child web browser in a minimized state and without focus, whereby the child web browser is hidden from a user.

8. The computer-readable storage medium of claim 6, wherein updating the city form element further comprises creating a selection list, wherein a user will make a selection from the selection list for the secondary form element.

9. The computer-readable storage medium of claim 6, wherein the state form element can be one of a checkbox, a textbox, a radio button, a drop-down list, and a button.

10. The computer-readable storage medium of claim 6, wherein the city form element can be one of a checkbox, a textbox, a radio button, a drop-down list, and a button.

11. A computer system configured to update a city form element in a parent web browser based on a selection of data in a state form element without refreshing the browser, comprising:

a processor;

a memory;

a displaying mechanism configured to display the form comprising the state form element and the city form element in the parent web browser;

a receiving mechanism configured to receive the selection of data in the state form element in the parent web browser;

a process mechanism configured to, in response to the selection of data in the state form element, spawn a child web browser by executing a client-side script in the parent web browser when an OnSelect event is invoked absent of assistance from any additional module;

a loading mechanism configured to load an updating mechanism into the child web browser;

an uploading mechanism configured to send the selection of data to a server from the child web browser;

a downloading mechanism configured to receive a response from the server at the child web browser, wherein the response includes data for the city form element that corresponds to the selection of data in the state form element wherein the updating mechanism is configured to automatically update the city form element in the parent web browser using the data for the city form element, upon downloading the data for the city form element; and wherein the updating mechanism is further configured to close the child web browser after updating the city form element.

12. The computer system of claim 11, wherein the process mechanism is further configured to spawn the child web browser in a minimized state and without focus, whereby the child web browser is hidden from a user.

13. The computer system of claim 11, wherein the updating mechanism is further configured to create a selection list, wherein a user will make a selection from the selection list for the city form element.

14. The computer system of claim 11, wherein the state form element can be one of a checkbox, a textbox, a radio button, a drop-down list, and a button.

15. The computer system of claim 11, wherein the city form element can be one of a checkbox, a textbox, a radio button, a drop-down list, and a button.

16. A means for updating a city form element of a form in a parent web browser based on a selection of data in a state form element of the form without refreshing the browser, comprising:

a displaying means for displaying the form comprising the state form element and the city form element in the parent web browser;

a receiving means for receiving the selection of data in the state form element in the parent web browser;

a process means for, in response to the data selection in the state form, spawning a child web browser by executing a client-side script in the parent web browser when an OnSelect event is invoked absent of assistance from any additional module;

a loading means for loading an updating means into the child web browser;

an uploading means for sending the selection of data to a server from the child web browser;

a downloading means for receiving a response from the server at the child web browser, wherein the response includes data for the city form element that corresponds to the selection of data in the state form element;

the updating means for automatically updating the city form element in the parent web browser using the data for the city form element, upon downloading the data for the city form element; and wherein the updating means is further configured to close the child web browser after updating the city form element.

* * * * *